US00RE48655E

(19) United States
(12) Reissued Patent
Vincelette et al.

(10) Patent Number: US RE48,655 E
(45) Date of Reissued Patent: Jul. 20, 2021

(54) METHOD AND APPARATUS FOR TIME ALIGNMENT OF ANALOG AND DIGITAL PATHWAYS IN A DIGITAL RADIO RECEIVER

(71) Applicant: Ibiquity Digital Corporation, Columbia, MD (US)

(72) Inventors: Scott Vincelette, Sparta, NJ (US); Ashwini Pahuja, Roslyn Heights, NY (US); Gabriel Olochwoszcz, Hillsborough, NJ (US)

(73) Assignee: Ibiquity Digital Corporation, Columbia, MD (US)

(21) Appl. No.: 16/575,185

(22) Filed: Sep. 18, 2019

Related U.S. Patent Documents

Reissue of:
(64) Patent No.: 9,768,948
Issued: Sep. 19, 2017
Appl. No.: 14/862,800
Filed: Sep. 23, 2015

(51) Int. Cl.

| | |
|---|---|
| ***H04B 1/16*** | (2006.01) |
| ***H04H 20/22*** | (2008.01) |
| ***H04H 60/58*** | (2008.01) |
| ***G10L 19/16*** | (2013.01) |
| ***H04L 7/00*** | (2006.01) |

(Continued)

(52) U.S. Cl.
CPC ..... *H04B 1/16* (2013.01); *G10L 19/167* (2013.01); *H04H 20/22* (2013.01); *H04H 60/58* (2013.01); *H04L 7/0016* (2013.01); *H04L 7/0079* (2013.01); *H04H 2201/18* (2013.01)

(58) Field of Classification Search
CPC ..... H04L 7/0079; H04L 7/0016; H04H 60/58; H04H 2201/18; H04H 20/22; G10L 19/167; H04B 1/16
See application file for complete search history.

(56) References Cited

U.S. PATENT DOCUMENTS

| | | | |
|---|---|---|---|
| 6,178,317 | B1 | 1/2001 | Kroeger et al. |
| 6,590,944 | B1 | 7/2003 | Kroeger |
| 6,735,257 | B2 | 5/2004 | Kroeger |

(Continued)

OTHER PUBLICATIONS

"U.S. Appl. No. 14/862,800, Final Office Action dated Oct. 18, 2016", 14 pgs.

(Continued)

*Primary Examiner* — Christina Y. Leung
(74) *Attorney, Agent, or Firm* — Schwegman Lundberg & Woessner, P.A.

(57) ABSTRACT

A method for processing a radio signal includes producing first and second streams of audio samples; decimating the first and second streams of audio samples to produce first and second streams of decimated streams of audio samples; estimating a first offset value between corresponding samples in the first and second streams of decimated streams of audio samples; shifting one of the first and second streams of audio samples by a first shift value; decimating the first and second streams of audio samples to produce third and fourth streams of decimated audio samples; estimating a second offset value; determining a final offset value based on an intersection of ranges of valid results of the first and second offset values; and shifting one of the first and second streams of audio samples by the final offset value to align the first and second streams of audio samples.

20 Claims, 5 Drawing Sheets

(51) Int. Cl.
*H03K 9/00* (2006.01)
*H04L 27/00* (2006.01)

(56) References Cited

U.S. PATENT DOCUMENTS

| | | | | |
|---|---|---|---|---|
| 6,836,520 | B1 | 12/2004 | Chen et al. | |
| 6,901,242 | B2 | 5/2005 | Kroeger et al. | |
| 6,982,948 | B2 | 1/2006 | Kroeger et al. | |
| 7,546,088 | B2 | 6/2009 | Kroeger et al. | |
| 7,733,983 | B2 | 6/2010 | Kroeger et al. | |
| 7,933,368 | B2 | 4/2011 | Peyla et al. | |
| 8,180,470 | B2 | 5/2012 | Pahuja | |
| 8,724,757 | B2 | 5/2014 | Cochran | |
| 8,976,969 | B2 | 3/2015 | Elenes et al. | |
| 9,768,948 | B2 | 9/2017 | Vincelette | |
| 2010/0027719 | A1* | 2/2010 | Pahuja | H04H 60/12 375/340 |
| 2013/0003637 | A1 | 1/2013 | Elenes et al. | |
| 2013/0003801 | A1* | 1/2013 | Elenes | H04H 40/18 375/224 |
| 2017/0085363 | A1 | 3/2017 | Vincelette et al. | |

OTHER PUBLICATIONS

"U.S. Appl. No. 14/862,800, Non Final Office Action dated Jul. 6, 2016", 10 pgs.
"U.S. Appl. No. 14/862,800, Notice of Allowance dated May 18, 2017", 8 pgs.
"U.S. Appl. No. 14/862,800, Response filed Apr. 17, 2017 to Final Office Action dated Oct. 18, 2016", 14 pgs.
"U.S. Appl. No. 14/862,800, Response filed Sep. 28, 2016 to Non Final Office Action dated Jul. 6, 2016", 11 pgs.
"In-Band/On-Channel Digital Radio Broadcasting Standard", NRSC-5-C, National Radio Systems Committee, Washington, DC,, (Sep. 2011), 6 pgs.

* cited by examiner

METHOD AND APPARATUS FOR TIME ALIGNMENT OF ANALOG AND DIGITAL PATHWAYS IN A DIGITAL RADIO RECEIVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE DISCLOSURE

The described methods and apparatus relate to digital radio broadcast receivers and, in particular, to methods and apparatus for time alignment of analog and digital pathways in digital radio receivers.

BACKGROUND INFORMATION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC signals can be transmitted in a hybrid format including an analog modulated carrier in combination with a plurality of digitally modulated carriers or in an all-digital format, wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

IBOC technology can provide digital quality audio, superior to existing analog broadcasting formats. Because each IBOC signal is transmitted within the spectral mask of an existing AM or FM channel allocation, it requires no new spectral allocations. IBOC promotes economy of spectrum while enabling broadcasters to supply digital quality audio to the present base of listeners.

The National Radio Systems Committee, a standard-setting organization sponsored by the National Association of Broadcasters and the Consumer Electronics Association, adopted an IBOC standard, designated NRSC-5, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5 IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XM Radio™, Sirius®), Digital Audio Radio Service (OARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Both AM and FM In-Band On-Channel (IBOC) broadcasting systems utilize a composite signal including an analog modulated carrier and a plurality of digitally modulated subcarriers. Program content (e.g., audio) can be redundantly transmitted on the analog modulated carrier and the digitally modulated subcarriers. The analog audio is delayed at the transmitter by a diversity delay.

In the absence of the digital audio signal (for example, when the channel is initially tuned) the analog AM or FM backup audio signal is fed to the audio output. When the digital audio signal becomes available, a blend function smoothly attenuates and eventually replaces the analog backup signal with the digital audio signal while blending in the digital audio signal such that the transition preserves some continuity of the audio program. Similar blending occurs during channel outages which corrupt the digital signal. In this case, the analog signal is gradually blended into the output audio signal by attenuating the digital signal such that the audio is fully blended to analog when the digital corruption appears at the audio output. Corruption of the digital audio signal can be detected during the diversity delay time through cyclic redundancy check (CRC) error detection means, or other digital detection means in the audio decoder or receiver.

The concept of blending between the digital audio signal of an IBOC system and the analog audio signal has been previously described in U.S. Pat. Nos. 7,546,088; 6,178,317; 6,590,944; 6,735,257; 6,901,242; and 8,180,470, the disclosures of which are hereby incorporated by reference. The diversity delay and blend allow the receiver to fill in the digital audio gaps with analog audio when digital outages occur. The diversity delay ensures that the audio output has a reasonable quality when brief outages occur in a mobile environment (for example, when a mobile receiver passes under a bridge). This is because the time diversity causes the outages to affect different segments of the audio program for the digital and analog signals.

In the receiver, the analog and digital pathways may be separately, and thus asynchronously, processed. In a software implementation, for example, analog and digital demodulation processes may be treated as separate tasks using different software threads. Subsequent blending of the analog and digital signals requires that the signals be aligned in time before they are blended.

One technique for determining time alignment between signals in digital and analog pathways performs a correlation between the samples of the two audio streams and looks for the peak of the correlation. This may require a large number of multiply operations and a large amount of memory.

It would be desirable to have a time alignment detection technique that can achieve a desired accuracy with a reduced number of multiplies and reduced memory requirements.

SUMMARY

In a first embodiment, a method for processing a radio signal includes receiving a radio broadcast signal having an analog portion and a digital portion; separating the analog portion of the radio broadcast signal from the digital portion of the radio broadcast signal; producing a first stream of audio samples representative of the analog portion of the radio broadcast signal; producing a second stream of audio samples representative of the digital portion of the radio broadcast signal; decimating the first and second streams of audio samples to produce first and second streams of decimated streams of audio samples; estimating a first offset value between corresponding samples in the first and second streams of decimated streams of audio samples, wherein the first offset value has a first range of valid results; shifting one of the first and second streams of audio samples by a first shift value; decimating the first and second streams of audio samples to produce third and fourth streams of decimated audio samples; estimating a second offset value between corresponding samples in the third and fourth streams of decimated streams of audio samples, wherein the second offset value has a second range of valid results; determining a final offset value based on an intersection of the first and second ranges of valid results; and shifting one of the first and second streams of audio samples by the final offset value to align the first and second streams of audio samples.

In another embodiment, a radio receiver includes processing circuitry configured to receive a radio broadcast signal having an analog portion and a digital portion; separate the analog portion of the radio broadcast signal from the digital portion of the radio broadcast signal; produce a first stream of audio samples representative of the analog portion of the radio broadcast signal; produce a second stream of audio samples representative of the digital portion of the radio broadcast signal; decimate the first and second streams of audio samples to produce first and second streams of decimated streams of audio samples; estimate a first offset value between corresponding samples in the first and second streams of decimated streams of audio samples, wherein the first offset value has a first range of valid results; shift one of the first and second streams of audio samples by a first shift value; decimate the first and second streams of audio samples to produce third and fourth streams of decimated audio samples; estimate a second offset value between corresponding samples in the third and fourth streams of decimated streams of audio samples, wherein the second offset value has a second range of valid results; determine a final offset value based on an intersection of the first and second ranges of valid results; and shift one of the first and second streams of audio samples by the final offset value to align the first and second streams of audio samples.

In another embodiment, a non-transitory, tangible computer readable medium comprising computer program instructions adapted to cause a processing system to execute steps including: receiving a radio broadcast signal having an analog portion and a digital portion; separating the analog portion of the radio broadcast signal from the digital portion of the radio broadcast signal; producing a first stream of audio samples representative of the analog portion of the radio broadcast signal; producing a second stream of audio samples representative of the digital portion of the radio broadcast signal; decimating the first and second streams of audio samples to produce first and second streams of decimated streams of audio samples; estimating a first offset value between corresponding samples in the first and second streams of decimated streams of audio samples, wherein the first offset value has a first range of valid results; shifting one of the first and second streams of audio samples by a first shift value; decimating the first and second streams of audio samples to produce third and fourth streams of decimated audio samples; estimating a second offset value between corresponding samples in the third and fourth streams of decimated streams of audio samples, wherein the second offset value has a second range of valid results; determining a final offset value based on an intersection of the first and second ranges of valid results; and shifting one of the first and second streams of audio samples by the final offset value to align the first and second streams of audio samples.

DETAILED DESCRIPTION

Embodiments described herein relate to the processing of the digital and analog components of a digital radio broadcast signal. While aspects of the disclosure are presented in the context of an exemplary IBOC system, it should be understood that the present disclosure is not limited to IBOC systems and that the teachings herein are applicable to other forms of digital radio broadcasting as well.

Figure 1:
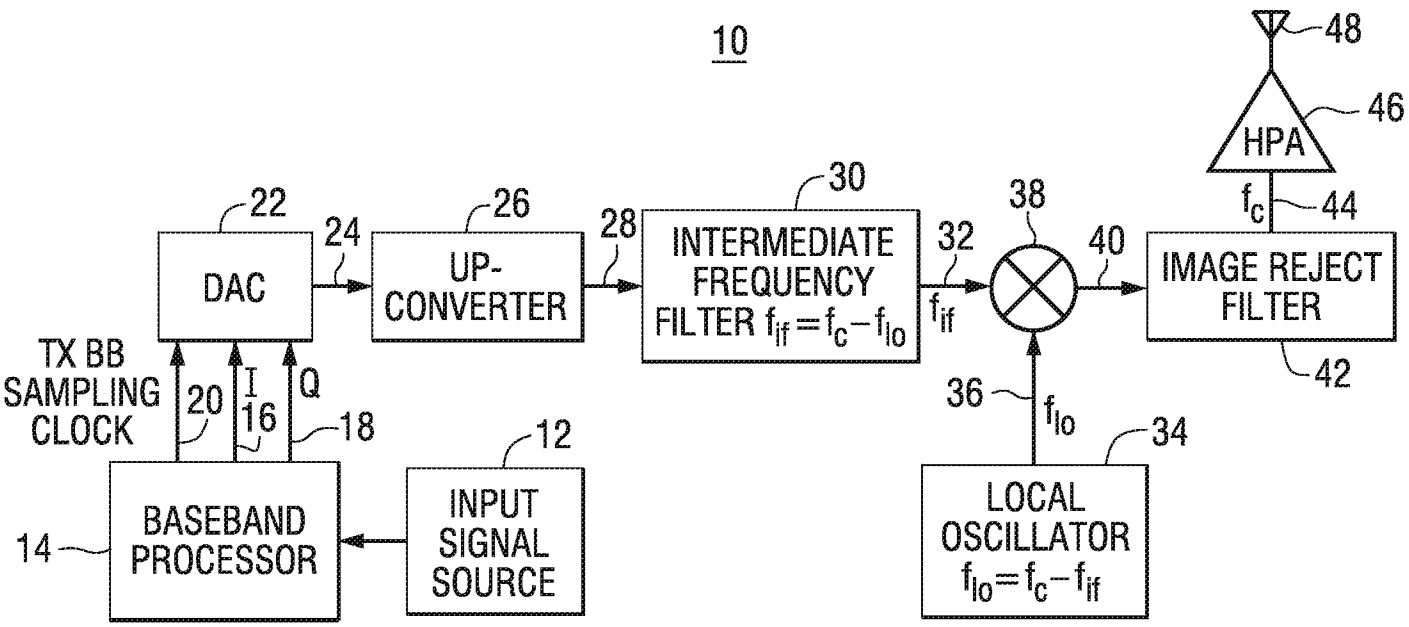
FIG. 1 is a functional block diagram of an exemplary digital radio broadcast transmitter.

Referring to the drawings, FIG. 1 is a block diagram of an exemplary digital radio broadcast transmitter 10 that broadcasts digital audio broadcasting signals. The exemplary digital radio broadcast transmitter may be a DAB transmitter such as an AM or FM IBOC transmitter, for example. An input signal source 12 provides the signal to be transmitted. The source signal may take many forms, for example, an analog program signal that may represent voice or music and/or a digital information signal that may represent message data such as traffic information. A baseband processor 14 processes the source signal in accordance with various known signal processing techniques, such as source coding, interleaving and forward error correction, to produce in-phase and quadrature components of a complex baseband signal on lines 16 and 18, and to produce a transmitter baseband sampling clock signal 20. Digital-to-analog converter (DAC) 22 converts the baseband signals to an analog signal using the transmitter baseband sampling clock 20, and outputs the analog signal on line 24. The analog signal is shifted up in frequency and filtered in the up-converter block 26. This produces an analog signal at an intermediate frequency $f_{if}$ on line 28. An intermediate frequency filter 30 rejects alias frequencies to produce the intermediate frequency signal $f_{if}$ on line 32. A local oscillator 34 produces a signal $f_{10}$ on line 36, which is mixed with the intermediate frequency signal on line 32 by mixer 38 to produce sum and difference signals on line 40. The unwanted intermodulation components and noise are rejected by image reject filter 42 to produce the modulated carrier signal $f_c$ on line 44. A high power amplifier (HPA) 46 then sends this signal to an antenna 48.

In one example, a basic unit of transmission of the DAB signal is the modem frame, which is typically on the order of a second in duration. Exemplary AM and FM IBOC DAB transmission systems arrange the digital audio and data in units of modem frames. Some transmission systems are both simplified and enhanced by assigning a fixed number of audio frames to each modem frame. The audio frame period is the length of time required to render, e.g., play back audio for a user, the samples in an audio frame. For example, if an audio frame contains 1024 samples, and the sampling period is 22.67 μsec, then the audio frame period would be approximately 23.2 milliseconds. A scheduler determines the total number of bits allocated to the audio frames within each modem frame. The modem frame duration is advantageous because it may enable sufficiently long interleaving times to mitigate the effects of fading and short outages or noise bursts such as may be expected in a digital audio broadcasting system. Therefore the main digital audio signal can be processed in units of modem frames, and audio processing, error mitigation, and encoding strategies may be able to exploit this relatively large modem frame time without additional penalty.

In typical implementations, an audio encoder may be used to compress the audio samples into audio frames in a manner that is more efficient and robust for transmission and reception of the IBOC signal over the radio channel. The audio encoder encodes the audio frames using the bit allocation for each modem frame. The remaining bits in the modem frame are typically consumed by the multiplexed data and overhead. Any suitable audio encoder can initially produce the compressed audio frames such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each modem frame could include 64 audio frames. In other typical implementations, each audio frame could be comprised of a single block of 2048 audio samples, and each modem frame could include 32 audio frames. Any other suitable combination of sample block sizes and audio frames per modem frame could be utilized.

In an exemplary IBOC DAB system, the broadcast signal includes main program service (MPS) audio, MPS data (MPSD), supplemental program service (SPS) audio, and SPS data (SPSD). MPS audio serves as the main audio programming source. In hybrid modes, it preserves the existing analog radio programming formats in both the analog and digital transmissions. MPSD, also known as program service data (PSD), includes information such as music title, artist, album name, etc. Supplemental program service can include supplementary audio content as well as PSD. Station Information Service (SIS) is also provided, which comprises station information such as call sign, absolute time, position correlated to GPS, and data describing the services available on the station. In certain embodiments, Advanced Applications Services (AAS) may be provided that include the ability to deliver many data services or streams and application specific content over one channel in the AM or FM spectrum, and enable stations to broadcast multiple streams on supplemental or sub-channels of the main frequency.

Figure 2:
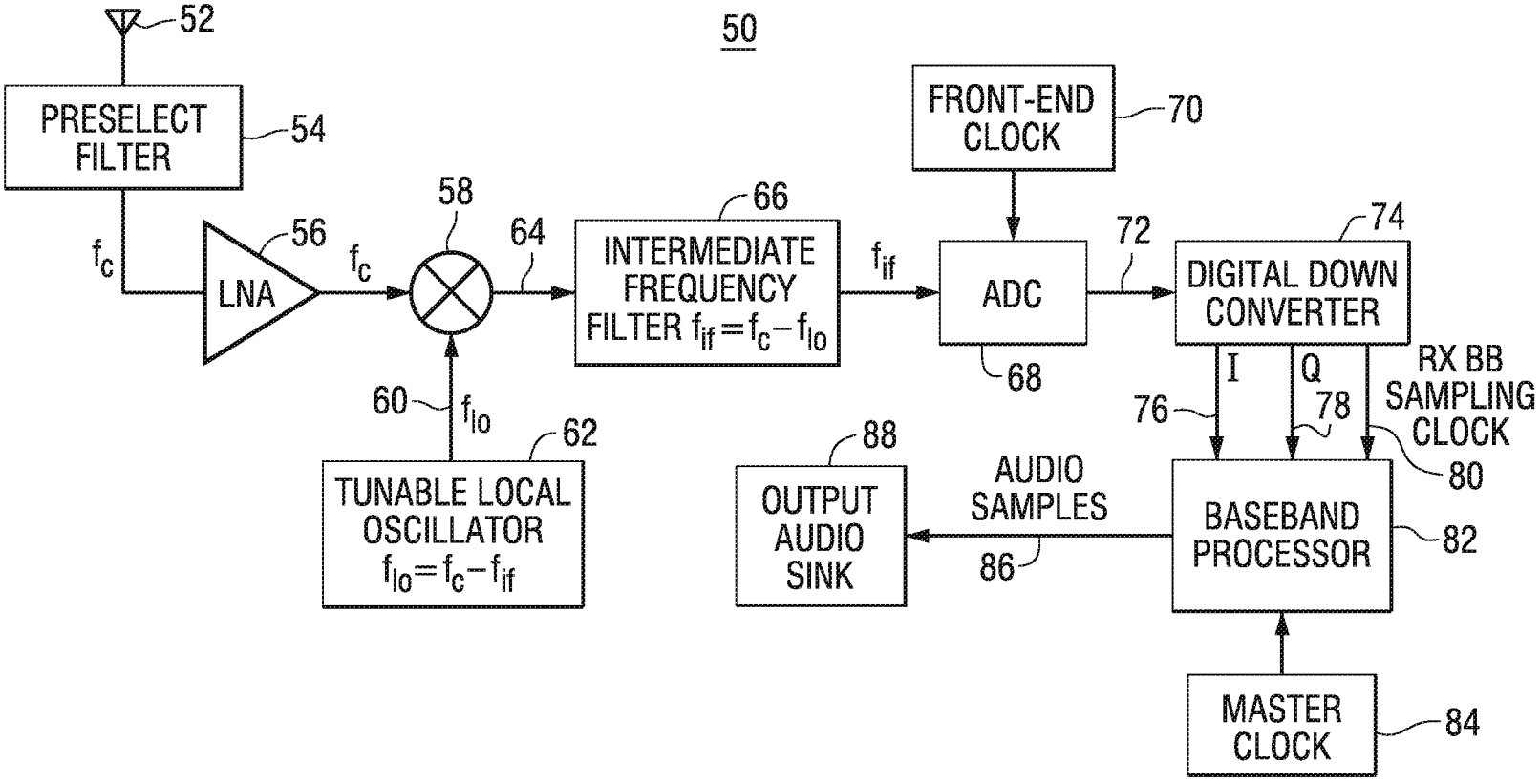
FIG. 2 is a functional block diagram of an exemplary digital radio broadcast receiver in accordance with certain embodiments.

A digital radio broadcast receiver performs the inverse of some of the functions described for the transmitter. FIG. 2 is a block diagram of an exemplary digital radio broadcast receiver 50. The exemplary digital radio broadcast receiver 50 may be a DAB receiver such as an AM or FM IBOC receiver, for example. The DAB signal is received on antenna 52. A bandpass preselect filter 54 passes the frequency band of interest, including the desired signal at frequency $f_c$, but rejects the image signal at $f_c-2f_{if}$ (for a low side lobe injection local oscillator). Low noise amplifier (LNA) 56 amplifies the signal. The amplified signal is mixed in mixer 58 with a local oscillator signal $f_{lo}$ supplied on line 60 by a tunable local oscillator 62. This creates sum ($f_c+f_{lo}$) and difference ($f_c-f_{lo}$) signals on line 64. Intermediate frequency filter 66 passes the intermediate frequency signal $f_{if}$ and attenuates frequencies outside of the bandwidth of the modulated signal of interest. An analog-to-digital converter (ADC) 68 operates using the front-end clock 70 to produce digital samples on line 72. Digital down converter 74 frequency shifts, filters and decimates the signal to produce lower sample rate in-phase and quadrature signals on lines 76 and 78. The digital down converter 74 also outputs a receiver baseband sampling clock signal 80. A baseband processor 82, operating using the master clock 84 that may or may not be generated from the same oscillator as the front-end clock 70, then provides additional signal processing. The baseband processor 82 produces output audio samples on line 86 for output to audio sink 88. The output audio sink may be any suitable device for rendering audio such as an audio-video receiver or car stereo system.

Figure 3:
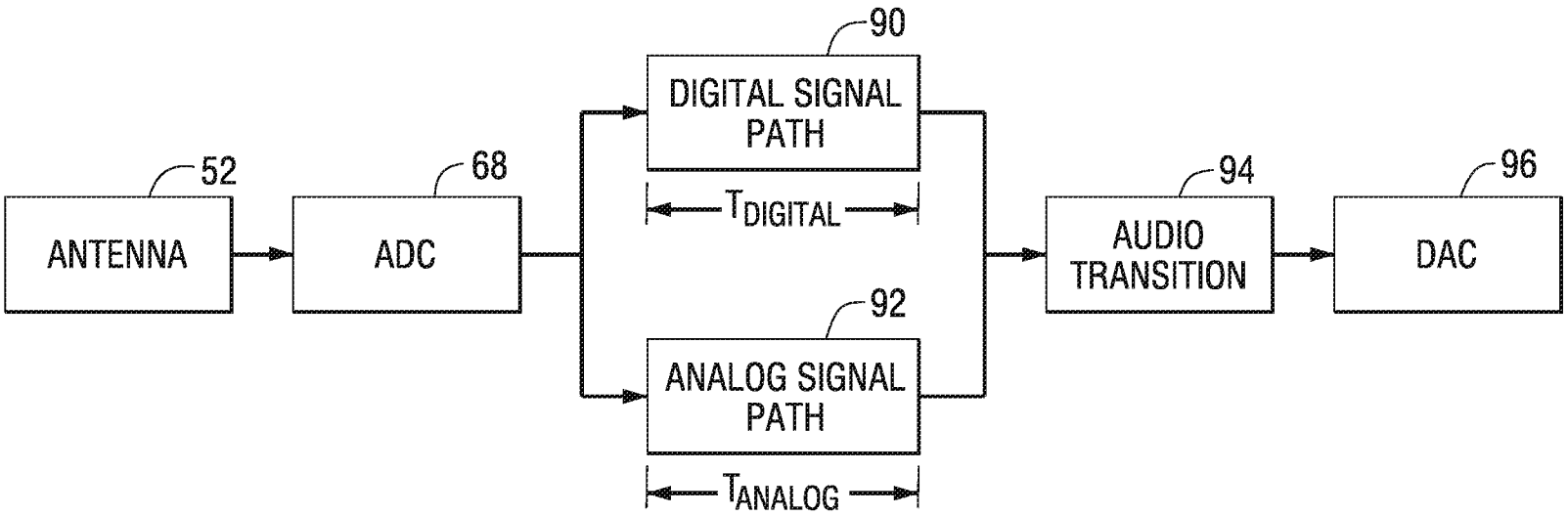
FIG. 3 is a functional block diagram that shows separate digital and analog signal paths in a receiver.

FIG. 3 is a functional block diagram that shows separate digital and analog signal paths in a receiver. A hybrid radio broadcast signal is received on antenna 52, and is converted to a digital signal in ADC 68. The hybrid signal is then split into a digital signal path 90 and an analog signal path 92. In the digital signal path 90, the digital signal is acquired, demodulated, and decoded into digital audio samples as described in more detail below. The digital signal spends an amount of time $T_{DIGITAL}$ in the digital signal path 90, which is a variable amount of time that will depend on the acquisition time of the digital signal and the demodulation and decoding times of the digital signal path. The acquisition time can vary depending on the strength of the digital signal due to radio propagation interference such as fading and multipath.

In contrast, the analog signal (i.e., the digitized analog audio samples) spends an amount of time $T_{ANALOG}$ in the analog signal path 92. $T_{ANALOG}$ is typically a constant amount of time that is implementation dependent. It should be noted that the analog signal path 92 may be co-located with the digital signal path on the baseband processor 82 or separately located on an independent analog processing chip. Since the time spent traveling through the digital signal path $T_{DIGITAL}$ and the analog signal path $T_{ANALOG}$ may be different, it is desirable to align the samples from the digital signal with the samples from the analog signal within a predetermined amount so that they can be smoothly combined in the audio transition module 94. The alignment accuracy will preferably be chosen to minimize the introduction of audio distortions when blending from analog to digital and visa versa. The digital and analog signals are combined and travel through the audio transition module 94. Then the combined digitized audio signal is converted into analog for rendering via the digital-to-analog converter (DAC) 96. As used in this description, references to "analog" or "digital" with regard to a particular data sample streams in this disclosure connote the radio signal from which the sample stream was extracted, as both data streams are in a digital format for the processing described herein.

One technique for determining time alignment between signals in digital and analog pathways performs a correlation between the samples of the two audio streams and looks for the peak of the correlation. Time samples of digital and analog audio are compared as one sample stream is shifted in time against the other. The alignment error can be calculated by successively applying offsets to the sample steams until the correlation peaks. The time offset between the two samples at peak correlation is the alignment error. Once the alignment error has been determined, the timing of the digital and/or analog audio samples can be adjusted to allow smooth blending of the digital and analog audio.

For an n point correlation, there are $n^2$ multiplies and the memory requirement is 2n samples for each stream, or 4n total samples. For a search range of 0.5 seconds and a sample rate of 44.1 k this requires approximately 487 million multiplies and 88 kBytes of memory. The accuracy of this technique is ±1 sample. In order to reduce the number of multiplies and the memory required many systems downsample the incoming audio streams and perform the correlation on the downsampled data. If the data is downsampled by 5, the total number of samples is reduced by ⅕ and the total number of multiplies is reduced by 1/25. The tradeoff is in resolution which is then ±2.5 samples of accuracy.

It would be desirable to have a method and apparatus for determining offset between analog and digital audio streams within a desired accuracy using downsampled audio streams.

In one embodiment, the detection and adjustment of the delay between the data streams as initially received may be performed by an alignment estimation module. The alignment estimation module may be implemented using one or more processors or other circuitry to detect which of the two data streams is leading, and to determine the amount of time offset between them. The time offset may be determined based on a number of samples that is a small fraction of the overall number of samples in each data stream. Based on the detected time offset, the alignment estimation module may generate one or more control signals that cause the alignment to be adjusted, and more particularly, to be reduced. The adjustment of the alignment may be performed by various methods, such as varying the sampling rate of one or more sample rate converters, or adjusting a pointer separation in a first-in first-out memory. The alignment may also be adjusted continuously or incrementally at a rate sufficiently slow so as to avoid audio artifacts if the analog sample stream leads the digital sample stream. The alignment estimation module may cease adjustments when the sample streams are sufficiently aligned, and provide a signal to a blend unit indicating that a blend operation may commence.

Figure 4:
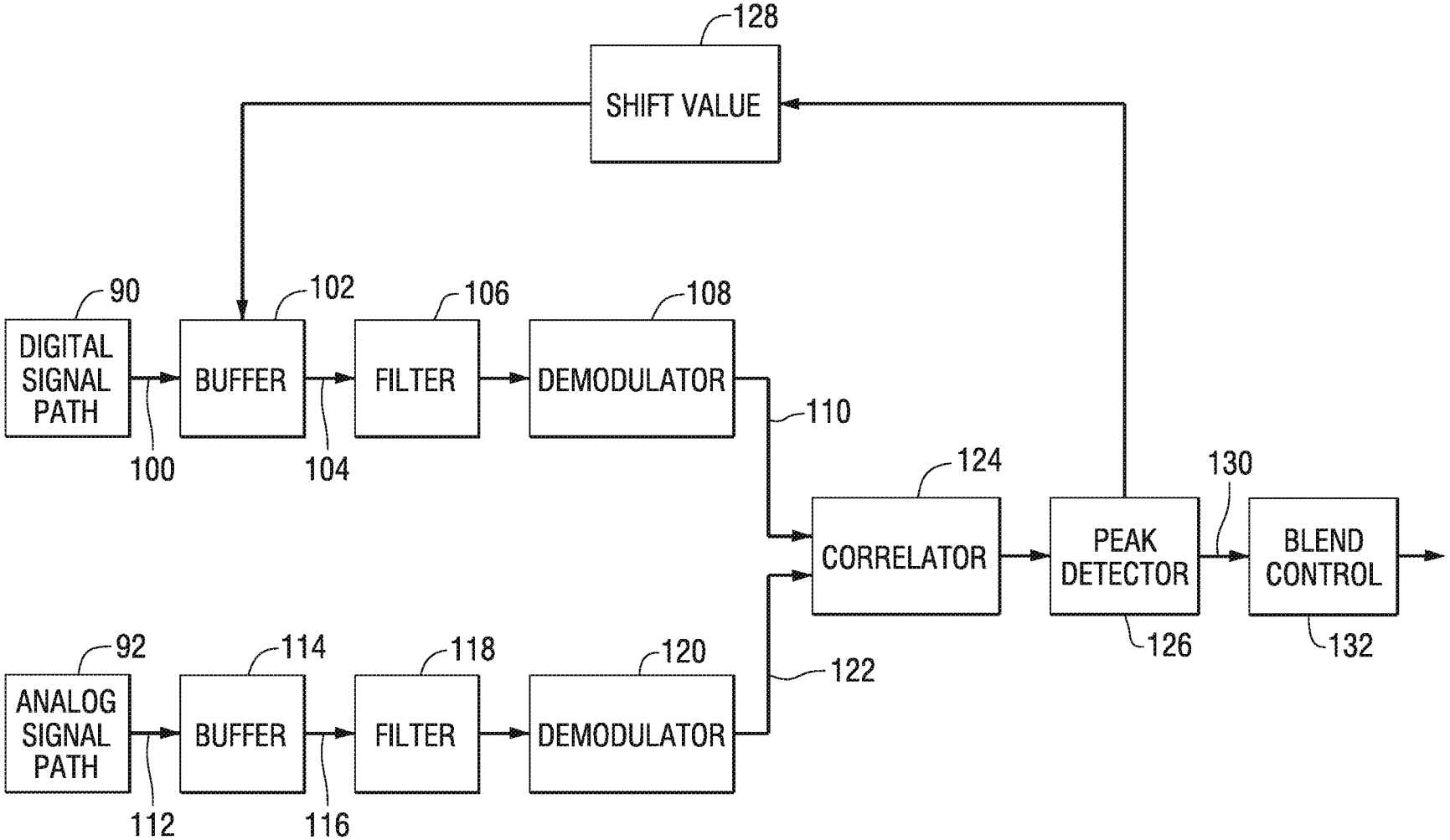
FIG. 4 is a functional block diagram that shows elements of a time alignment module.

FIG. 4 is a functional block diagram of an apparatus for determining offset between analog and digital audio streams within a desired accuracy using downsampled audio streams. In the embodiment of FIG. 4, the digital signal path 90 supplies a first stream of samples representative of the content of the received digitally modulated signal on line 100. The samples from the first sample stream are stored in buffer 102. The first stream of samples on line 104 is filtered by an anti-aliasing filter 106 and downsampled (decimated) as shown in block 108 to produce a first decimated sample stream on line 110. The analog signal path 92 supplies a second stream of samples representative of the content of the received analog modulated signal on line 112. Samples from the second stream of samples are stored in buffer 114. The second stream of samples on line 116 is filtered by an anti-aliasing filter 118 and downsampled (decimated) as shown in block 120 to produce a second decimated sample stream on line 122. A correlator 124 performs a cross-correlation on samples of the first and second decimated sample streams and a peak detector 126 determines an offset between samples of the decimated streams that are most highly correlated. Due to the decimation of the input signals, the peak detector output actually represents a range of possible stream offsets. This offset range is then used to determine a shift value for one of the first and second sample streams, as illustrated in block 128. Then the shifted sample stream is decimated and correlated with the decimated samples from the unshifted stream. By running the estimation multiple times with a shifted input, the range of valid results is now limited to the intersection of the range of valid results of the first estimation and the range of valid results of the second estimation. The steps of shifting, decimating, correlating and peak detection can be repeated until a desired accuracy of the time alignment of the first and second sample streams is achieved. At that point, a control signal is output on line 130. Then the blend control 132 can use the control signal to blend the analog and digital signal paths.

The correlation operation performed by the correlator may include multiplying together decimated data from each stream. The result of the multiplication may appear as noise, with a large peak when the data streams are aligned in time.

In the embodiment shown, the peak detector may analyze correlation results over time to search for peaks that indicate that the digital data streams are aligned in time. In some embodiments, a squaring function may square the product output by the correlator in order to further emphasize the peaks. Based on the received data, the peak search unit may output an indication of the relative delay between the analog data stream and the digital data stream. The indication of relative delay may include an indication of which one of the two data streams is leading the other.

Once the analog and digital data streams are sufficiently aligned, a blend operation may begin. The blend operation may be conducted as previously described, reducing the contribution of the analog data stream to the output audio while correspondingly increasing the contribution of the digital data stream until the latter is the exclusive source.

Figure 5:
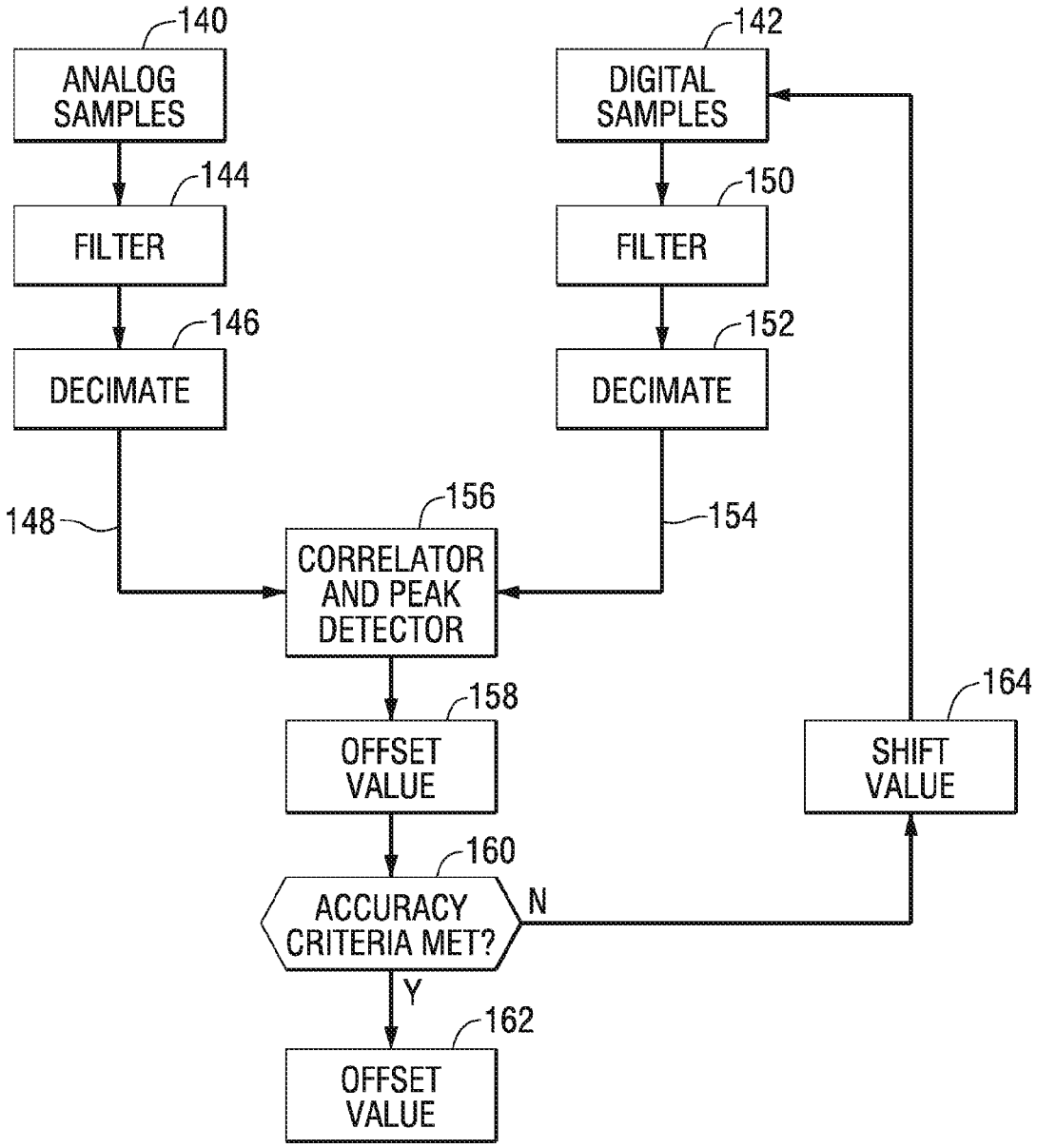
FIG. 5 is a flow block diagram of a method for time alignment in accordance with certain embodiments.

FIG. 5 is a flow diagram of one embodiment of a method for determining relative time offset between two data streams extracted from a radio simulcast. While the method of FIG. 5 may be implemented by the apparatus shown in FIG. 4 and described herein, other hardware embodiments, as well as software embodiments and combinations thereof, may also be used to implement the method.

FIG. 5 shows an analog sample stream in block 140 and a digital sample stream in block 142. The analog sample stream is filtered by an anti-aliasing filter in block 144 and decimated in block 146 to produce a decimated analog sample stream on line 148. The digital sample stream is filtered by an anti-aliasing filter in block 150 and decimated in block 152 to produce a decimated digital sample stream on line 154. Prior to decimation, an anti-aliasing filter is required. A correlation and peak detection operation is performed on the decimated analog and digital sample streams in block 156. This produces an offset value representative of the offset between the decimated analog and digital sample streams, as shown in block 158. If this offset value has been determined to a desired accuracy (block 160) then the offset value is output to block 162. If this offset value has not been determined to a desired accuracy (block 160) then a sample shift value is set in block 164, and one of the original sample streams (in the example of FIG. 5, the digital sample stream) is shifted by the shift value and the correlation and peak detection is repeated using the shifted digital sample stream.

The correlation algorithm is run multiple times to achieve a desired accuracy, for example ±1 sample. Each time the algorithm is run, the starting point of one of the streams is offset by an amount determined by the current result.

In one embodiment, a method for processing a radio signal includes receiving a radio broadcast signal having an analog portion and a digital portion; separating the analog portion of the radio broadcast signal from the digital portion of the radio broadcast signal; producing a first stream of audio samples representative of the analog portion of the radio broadcast signal; producing a second stream of audio samples representative of the digital portion of the radio broadcast signal; decimating the first and second streams of audio samples to produce first and second streams of decimated streams of audio samples; estimating a first offset value between corresponding samples in the first and second streams of decimated streams of audio samples, wherein the first offset value has a first range of valid results; shifting one of the first and second streams of audio samples by a first shift value; decimating the first and second streams of audio samples to produce third and fourth streams of decimated audio samples; estimating a second offset value between corresponding samples in the third and fourth streams of decimated streams of audio samples, wherein the second offset value has a second range of valid results; determining a final offset value based on an intersection of the first and second ranges of valid results; and shifting one of the first and second streams of audio samples by the final offset value to align the first and second streams of audio samples.

As a specific example, assume that the sample streams are decimated by a factor of 4. The correlation has an error of ±2 samples relative to the pre-decimated sample streams. By shifting the input data and running the estimation a second time the correlation error can be reduced to ±1 sample.

An example that runs the algorithm two times to achieve an accuracy of ±1 sample follows. Assume that after the 1st run the result is that the digital stream is +4 samples ahead of the analog stream. The range of valid results is therefore +2 samples ahead and +6 samples ahead (i.e. result=4±2 samples accuracy).

```
// For the 2nd run, advance the digital starting point by 2 samples.
// The range of valid results is shifted and is now between
// +4 and +8 samples
if (2nd run result = +4)
{
    // The range of valid results for a +4 answer is +2 to +6.
    // However, from the first estimation it must be +4 to +8
    // The intersection of these is +4 to +6 which is the new valid range
    // Therefore, selecting a final result of 5 has an error of +/−1 samples
}
else if (2nd run result = + 8)
{
    // The range of valid results for a +8 answer is +6 to +10.
    // However, from the first estimation it must be +4 to +8
    // The intersection of these is +6 to +8 which is the new valid range
    // Therefore, selecting a final result of 7 has an error of +/−1 sample
}
```

Since this algorithm is run twice, the total number of multiplies is $2*((n/4)^2)=0.125*n^2$ compared to $n^2$, which represents an 87.5% savings. The total memory required is (2*(n/4)) compared to (2*n) samples, representing a 75% savings of memory. The described example achieves a higher resolution time alignment using a downsample by 4, and running the algorithm multiple times for consistency.

The number of samples to shift for each successive estimation is best determined by placing the valid result range of an estimation between two valid answers for the next estimation. Using the example above, the valid result range after the first estimation is +2 to +6 samples. For the next estimation, the possible valid answers are 0, 4, 8, etc. By shifting the input up 2 samples, the valid range for the second estimation is now +4 to +8, equally between two possible valid answers of the second estimation. By shifting the input to realign the valid result range, the result range of subsequent estimations will intersect the initial result range and limit the possible valid results.

As an alternative, a shift of −2 samples could have been used which would shift the range of possible results down 0 to +4, again equally between two possible results of the second estimation An extension of this methodology would be to change the decimation ratio of the input samples in subsequent estimations. This could enable additional savings in multiplies and memory.

In another embodiment, a radio receiver includes processing circuitry configured to receive a radio broadcast signal having an analog portion and a digital portion; separate the analog portion of the radio broadcast signal from the digital portion of the radio broadcast signal; produce a first stream of audio samples representative of the analog portion of the radio broadcast signal; produce a second stream of audio samples representative of the digital portion of the radio broadcast signal; decimate the first and second streams of audio samples to produce first and second streams of decimated streams of audio samples; estimate a first offset value between corresponding samples in the first and second streams of decimated streams of audio samples, wherein the first offset value has a first range of valid results; shift one of the first and second streams of audio samples by a first shift value; decimate the first and second streams of audio samples to produce third and fourth streams of decimated audio samples; estimate a second offset value between corresponding samples in the third and fourth streams of decimated streams of audio samples, wherein the second offset value has a second range of valid results; determine a final offset value based on an intersection of the first and second ranges of valid results; and shift one of the first and second streams of audio samples by the final offset value to align the first and second streams of audio samples.

In another embodiment, a non-transitory, tangible computer readable medium comprising computer program instructions adapted to cause a processing system to execute steps including: receiving a radio broadcast signal having an analog portion and a digital portion; separating the analog portion of the radio broadcast signal from the digital portion of the radio broadcast signal; producing a first stream of audio samples representative of the analog portion of the radio broadcast signal; producing a second stream of audio samples representative of the digital portion of the radio broadcast signal; decimating the first and second streams of audio samples to produce first and second streams of decimated streams of audio samples; estimating a first offset value between corresponding samples in the first and second streams of decimated streams of audio samples, wherein the first offset value has a first range of valid results; shifting one of the first and second streams of audio samples by a first shift value; decimating the first and second streams of audio samples to produce third and fourth streams of decimated audio samples; estimating a second offset value between corresponding samples in the third and fourth streams of decimated streams of audio samples, wherein the second offset value has a second range of valid results; determining a final offset value based on an intersection of the first and second ranges of valid results; and shifting one of the first and second streams of audio samples by the final offset value to align the first and second streams of audio samples.

The method and apparatus described herein may be implemented with the various embodiments of a radio receiver and processes performed therein as discussed above, and may be utilized with various other hardware and/or software embodiments not explicitly discussed herein.

In existing hybrid digital radios, after tuning to a station analog audio is initially played while digital audio is being acquired. After digital audio acquisition a blend occurs whereby digital audio is output and analog audio is no longer played. Without the method described above digital audio will be played immediately upon acquisition, however, the two audio streams may not be aligned causing an echo to be heard when switching from analog audio to digital audio. Including the time alignment described above will delay the transition to digital audio while guaranteeing a seamless transition for the listener While the invention has been described in terms of several embodiments, it will be apparent to those skilled in the art that various changes can be made to the disclosed embodiments without departing from the scope of the invention as defined by the following claims. The embodiments described above and other embodiments are within the scope of the claims.

What is claimed is:

1. A method comprising:

receiving [a radio broadcast signal having an analog portion and a digital portion] *an audio signal including multiple audio streams*;

separating [the analog portion of] the [radio broadcast] *audio* signal [from the digital portion of the radio broadcast signal;

producing] *into* a first stream of audio samples [representative of the analog portion of the radio broadcast signal;

producing] *and* a second stream of audio samples[ representative of the digital portion of the radio broadcast signal];

decimating the first and second streams of audio samples to produce first and second streams of decimated audio samples;

estimating a first offset value between corresponding samples in the first and second streams of decimated audio samples, wherein the first offset value has a first range of valid results;

shifting one of the first and second streams of audio samples by a first shift value within the first range of valid results;

decimating the first and second streams of audio samples to produce third and fourth streams of decimated audio samples;

estimating a second offset value between corresponding samples in the third and fourth streams of decimated audio samples, wherein the second offset value has a second range of valid results;

determining a final offset value based on an intersection of the first and second ranges of valid results; and shifting one of the first and second streams of audio samples by the final offset value to align the first and second streams of audio samples.

2. The method of claim 1, wherein the first shift value is selected such that the first range of valid results is between two valid results for the second offset.

3. The method of claim 1, wherein the first shift value is selected such that the first and second ranges of valid results intersect.

4. The method of claim 1, further comprising:

blending the first and second streams of audio samples to produce an audio output.

5. The method of claim 1, further comprising:

shifting one of the first and second streams of audio samples by a second offset value within the second range of valid results;

decimating the first and second streams of audio samples to produce fifth and sixth streams of decimated audio samples; and estimating a third offset value between corresponding samples in the fifth and sixth streams of decimated audio samples, wherein the third offset value has a third range of valid results;

wherein the step of determining a final offset value is based on an intersection of the first and second ranges of valid results and the third range of valid results.

6. The method of claim 1, wherein:

the steps of decimating the first and second streams of audio samples to produce first and second streams of decimated audio samples, and decimating the first and second streams of audio samples to produce third and fourth streams of decimated audio samples, are [pre-formed] *performed* at different decimation rates.

7. The method of claim 5, further comprising:

blending the first and second streams of audio samples to produce an audio output.

8. [A radio] *An audio signal* receiver comprising:

processing circuitry configured to: receive a [radio broadcast] *an audio* signal having [an analog portion and a digital portion] *multiple audio streams*; separate the [analog portion of the radio broadcast signal from the digital portion of the radio broadcast signal; produce a first stream of audio samples representative of the analog portion of the radio broadcast signal; produce a second stream of audio samples representative of the digital portion of the radio broadcast signal;] *audio signal into a first audio sample stream and a second audio sample stream* decimate the first and second *audio sample* streams [of audio samples] to produce first and second streams of decimated audio samples; estimate a first offset value between corresponding samples in the first and second streams of decimated audio samples, wherein the first offset value has a first range of valid results; shift one of the first and second *audio sample* streams [of audio samples] by a first shift value within the first range of valid results; decimate the first and second *audio sample* streams [of audio samples] to produce third and fourth streams of decimated audio samples; estimate a second offset value between corresponding samples in the third and fourth streams of decimated audio samples, wherein the second offset value has a second range of valid results; determine a final offset value based on an intersection of the first and second ranges of valid results; and shift one of the first and second *audio sample* streams [of audio samples] by the final offset value to align the first and second *audio sample* streams[ of audio samples].

9. The [radio] *audio signal* receiver of claim 8, wherein the receiver is further configured to select the first shift value such that the first range of valid results is between two valid results for the second offset.

10. The [radio] *audio signal* receiver of claim 8, wherein the receiver is further configured to select the first shift value such that the first and second ranges of valid results intersect.

11. The [radio] *audio signal* receiver of claim 8, wherein the receiver is further configured to blend the first and second *audio sample* streams [of audio samples] to produce an audio output.

12. The [radio] *audio signal* receiver of claim 8, wherein the receiver is further configured to[:] shift one of the first and second *audio sample* streams [of audio samples] by a second offset value within the second range of valid results; decimate the first and second *audio sample* streams [of audio samples] to produce fifth and sixth streams of decimated audio samples; and estimate a third offset value between corresponding samples in the fifth and sixth streams of decimated audio samples, wherein the third offset value has a third range of valid results; wherein the step of determining a final offset value is based on an intersection of the first and second ranges of valid results and the third range of valid results.

13. The [radio] *audio signal* receiver of claim [8] *12*, wherein the receiver is further configured to [perform the functions of decimating] *blend* the first and second *audio sample* streams [of audio samples] to produce [first and second streams of decimated audio samples, and decimating the first and second streams of audio samples to produce third and fourth streams of decimated audio samples, at different decimation rates] *an audio output*.

14. The [radio] *audio signal* receiver of claim [12] *8*, wherein the receiver is further configured to [blend] *perform the functions of decimating* the first and second *audio sample* streams [of audio samples] to produce [an audio output] *first and second streams of decimated audio samples, and decimating the first and second audio sample streams to produce third and fourth streams of decimated audio samples, at different decimation rates*.

15. A non-transitory, tangible computer readable medium comprising computer program instructions adapted to cause a processing system to execute steps comprising:

receiving [a radio broadcast] *an audio* signal having [an analog portion] *a first audio sample stream* and a [digital portion] *second audio sample stream*;

separating the [analog portion] *first audio sample stream* of the [radio broadcast] *audio* signal from the [digital portion] *second audio sample stream* of the [radio broadcast] *audio* signal;

[producing a first stream of audio samples representative of the analog portion of the radio broadcast signal;

producing a second stream of audio samples representative of the digital portion of the radio broadcast signal;]

decimating the first and second [streams of] audio [samples] *sample streams* to produce first and second streams of decimated audio samples;

estimating a first offset value between corresponding samples in the first and second streams of decimated audio samples, wherein the first offset value has a first range of valid results;

shifting one of the first and second *audio sample* streams [of audio samples] by a first shift value within the first range of valid results;

decimating the first and second *audio sample* streams [of audio samples] to produce third and fourth streams of decimated audio samples;

estimating a second offset value between corresponding samples in the third and fourth streams of decimated audio samples, wherein the second offset value has a second range of valid results;

determining a final offset value based on an intersection of the first and second ranges of valid results; and shifting one of the first and second *audio sample* streams [of audio samples] by the final offset value to align the first and second *audio sample* streams[ of audio samples].

16. The computer readable medium of claim 15, wherein the computer program instructions are further adapted to cause a processing system to select the first shift value such that the first range of valid results is between two valid results for the second offset.

17. The computer readable medium of claim 15, wherein the computer program instructions are further adapted to cause a processing system to select the first shift value such that the first and second ranges of valid results intersect.

18. The computer readable medium of claim 15, wherein the computer program instructions are further adapted to cause a processing system to blend the first and second *audio sample* streams [of audio samples] to produce an audio output.

19. The computer readable medium of claim 15, wherein the computer program instructions are further adapted to cause a processing system to:

shift one of the first and second *audio sample* streams [of audio samples] by a second offset value within the second range of valid results;

decimate the first and second *audio sample* streams [of audio samples] to produce fifth and sixth streams of decimated audio samples; and estimating a third offset value between corresponding samples in the fifth and sixth streams of decimated audio samples, wherein the third offset value has a third range of valid results;

wherein the step of determining a final offset value is based on an intersection of the first and second ranges of valid results and the third range of valid results.

20. The computer readable medium of claim 19, wherein the computer program instructions are further adapted to cause a processing system to:

decimate the first and second *audio sample* streams [of audio samples] to produce first and second streams of decimated audio samples, and decimate the first and second *audio sample* streams [of audio samples] to produce third and fourth streams of decimated audio samples, at different decimation rates.

* * * * *